July 14, 1936.  J. P. HANSON  2,047,469
AUTOMOBILE SIGNAL
Filed Nov. 4, 1930   3 Sheets-Sheet 1
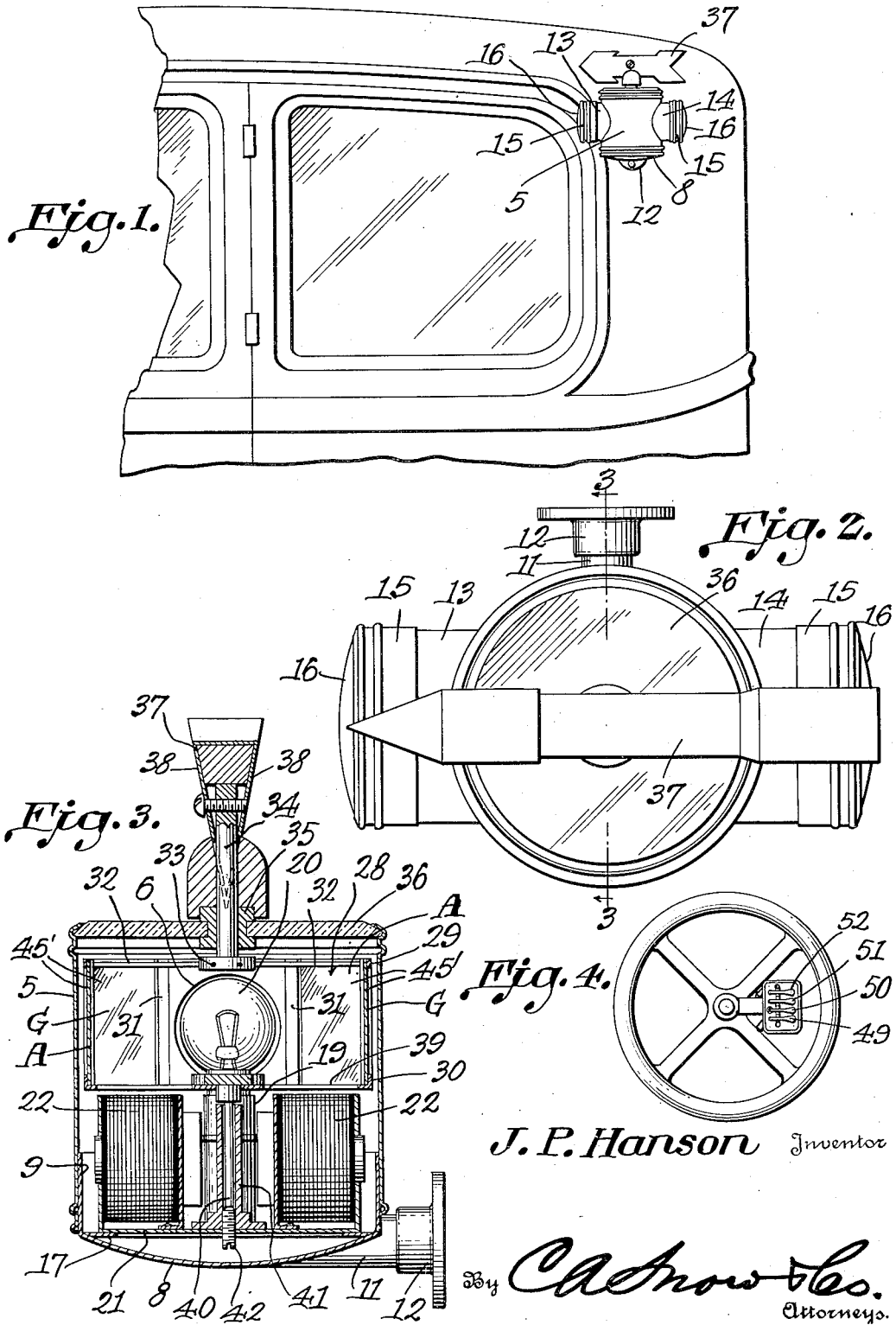

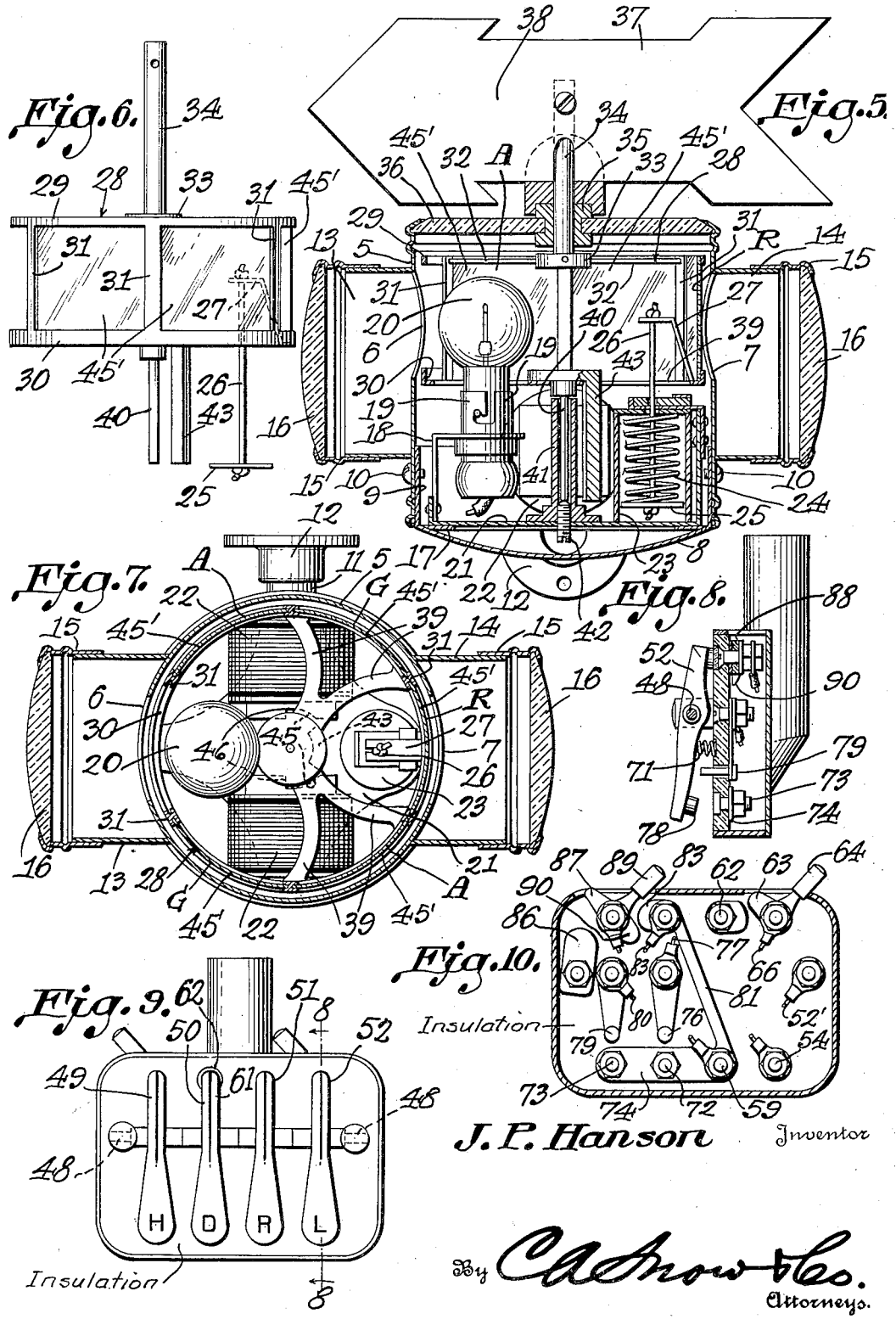

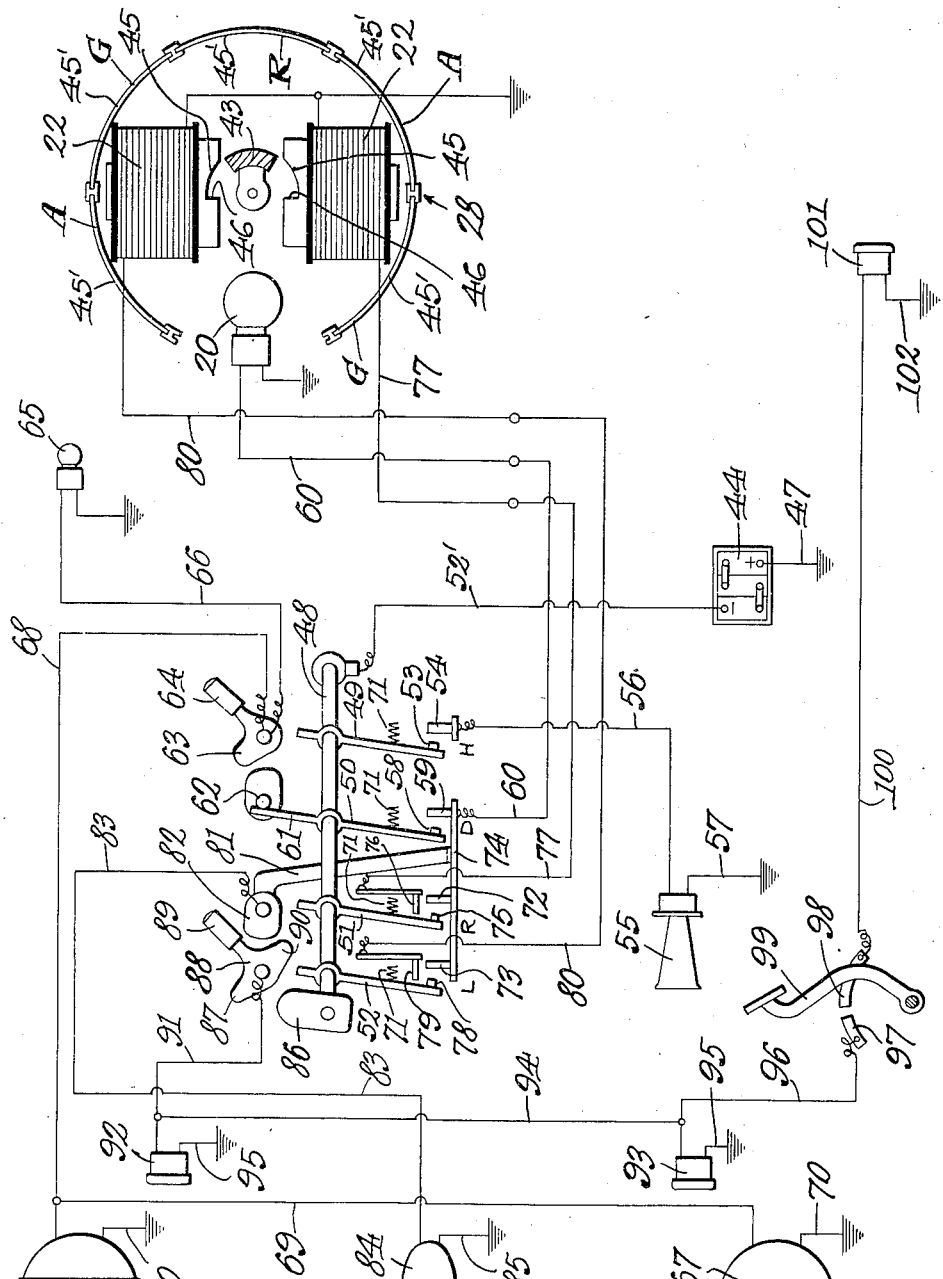

Patented July 14, 1936

2,047,469

UNITED STATES PATENT OFFICE 2,047,469

AUTOMOBILE SIGNAL

John P. Hanson, Butte, Mont.

Application November 4, 1930, Serial No. 493,399

1 Claim. (Cl. 177—327)

This invention relates to signals or semaphores primarily designed for use in connection with motor vehicles, to indicate the direction of travel to be taken by the vehicle equipped with the signal, and aims to improve generally the construction shown and described in my Patent No. 1,687,065.

An important object of the invention is to provide a signal of this character including electro-magnets having cores of novel constructions, to cause the speed of the armature, to be gradually increased, as the armature is being drawn towards the core, energized.

Another important object of the invention is the provision of an indicator in the form of an arrow, the arrow being of a novel construction to cause the light rays to clearly illuminate the sides thereof, so that the arrow or indicator will be clearly visible at all times.

A still further object of the invention is to provide a lamp housing having diametrically opposed windows through which light rays may pass forwardly and rearwardly therefrom, and a translucent cover for the housing, so that light rays may be directed upwardly to illuminate the indicator or arrow.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a view illustrating the signal attached to the body of a motor vehicle.

Figure 2 is a plan view of the signal.

Figure 3 is a sectional view taken on line 3—3 of Figure 2.

Figure 4 is a view illustrating the switches for controlling the circuits to the indicator, as mounted on the steering wheel.

Figure 5 is a vertical sectional view through the housing.

Figure 6 is an elevational view of the movable cage, that operates within the housing.

Figure 7 is a transverse sectional view through the housing.

Figure 8 is a sectional view taken on line 8—8 of Figure 9.

Figure 9 is a plan view of the switch box and switch arms.

Figure 10 is a transverse sectional view through the switch box.

Figure 11 is a diagram indicating the circuits for controlling the lights and indicator.

Referring to the drawings in detail, the reference character 5 designates a cylindrical housing, that is provided with openings 6 and 7 which are diametrically opposed, so that light rays from the interior of the housing may be projected forwardly and rearwardly. The bottom of the housing is indicated by the reference character 8, the bottom being provided with an upstanding flange 9, over which the cylindrical housing 5 fits, there being provided screws 10 for holding the housing in position on the bottom. Formed integral with the bottom 8, is an arm 11 having a flared extremity 12 constituting the bracket for the housing.

Projecting tubes 13 and 14 respectively, are secured to the housing, and enclose the openings 6 and 7, the tubes 13 and 14 being provided with removable lens holders 15 that support the lenses 16 formed preferably of clear glass.

Forming a part of the bottom 8, is a supporting ring 17 that acts as a support for the bracket 18 that supports the lamp socket 19, in which the lamp 20 is mounted. A supporting plate 21 is secured to the ring 17 and provides a support for the electro-magnets 22 and spring housing 23, in which the coiled spring 24 is mounted. At one end of the coiled spring 24 is a disk 25 to which the cord 26 is secured, the cord 26 having its opposite end secured to the bracket 27, that is carried by the cage 28 to be hereinafter more fully described.

This cage 28 comprises upper and lower rings 29 and 30 respectively, which rings are held in spaced relation by means of the bars 31. Secured to the upper ring 29, are rods 32 that extend inwardly and connect with the disk-like member 33, to which the vertical shaft 34 is secured. This vertical shaft 34 extends through the bearing 35, which is mounted in a central opening formed in the cover 36, which is formed of suitable translucent material, preferably glass. The vertical shaft 34 provides a support for the indicator 37, which is in the form of an arrow, and as shown the arrow is provided with downwardly inclined side walls 38, so constructed that the light rays projected through the translucent cover 36, will illuminate both sides of the indicator so that the same will be clearly visible.

Secured to the lower ring 30, are arms 39 that extend across the ring 30, and provide a support for the vertical shaft 40, which extends into the tubular bearing 41 that extends upwardly from the supporting plate 21. At the lower end of the tubular bearing 41, is a vertically adjustable bearing 42, on which the lower end of the shaft 40 rests. Thus it will be seen that due to this construction, an exceptionally sensitive bearing is provided for the shaft 40, so that the indicator will operate readily. Mounted at the upper end of the shaft 40, is an armature 43 that is relatively long and so constructed that it may be attracted by the cores of the magnets 22.

The cores of the magnets are of novel constructions and as clearly shown by Figure 11 of the drawings, the cores are formed with cut out portions defining curved surfaces 45 terminating in shoulders 46, the construction being such as to cause the armature 43 to move slowly, when a core is energized, the speed of the armature being gradually increased as it moves towards the shoulder 46. It will further be seen that due to the construction of the cores, a magnet may be used for imparting sufficient rotary movement to the armature to operate the cage and indicator. Movement of the cage is restricted, by the action of the spring 24, which is placed under tension, when the cage is rotated in either direction. The bars 31 of the cage 28 are formed with longitudinal grooves in their side edges, which grooves receive the sheets of translucent material 45' which are of various colors, so that the light rays projected through the members 45', will signal to people near the device, the direction of travel to be taken by the vehicle. When the cage is in its normal position, the member 45', indicated by the reference letter R, is red, so that the light rays normally projected through the rear lens 16, are red.

The space between the bars 31 directly opposite to the member 45' colored red, is left open, so that the normal light rays from the lamp will be projected forwardly from the housing. Members 45' indicated by the reference letter A are amber colored, and are so arranged that when the cage is moved to cause the indicator or arrow 37 to indicate travel to the left, the members A will fall opposite to the openings 6 of the housing, directing amber colored light rays through the lenses 16.

The members 45' indicated by the letter G are colored green and are so arranged that when the cage is rotated to move the indicator 37 to indicate travel to the right, these green colored members will be brought before the openings 6, to the end that green light rays are projected through the lenses 16. The lamp 20 and electromagnets 22 are in circuit with the battery 44, which is grounded to the frame of the vehicle through the wire 47. The reference character 48 designates the supporting rod of the switch, on which the switch arms 49, 50, 51 and 52 are mounted, the arms being so mounted that they may pivot on the rod 48, to complete circuits, in a manner to be hereinafter more fully described. A wire 52' leads from the battery 44, to the supporting rod 48, and supplies electric current to the switch arms, through the rod 48. At the outer end of the arm 49 is a contact point 53 that is adapted to engage the contact member 54 that is in circuit with the horn 55, through the wire 56, the circuit to the horn being grounded through the wire 57.

Switch arm 50 is provided with a contact member 58 that engages the contact member 59 which is in circuit with the lamp 20, through the wire 60, so that when the switch arm 50 is depressed by the operator, the lamp 20 is illuminated. The switch arm 50 is substantially long and has its end 61 so arranged that it engages the contact member 62 which is engaged by the blade 63 of the switch arm 64, the switch blade 63 being in circuit with the tail light 65, through the wire 66.

The switch blade 63 is also in circuit with the head lights 67, through the wires 68 and 69, these circuits being grounded through wires 70. Thus it will be seen that should it be desired to operate the vehicle with the headlights 67 and tail light 65 illuminated, the switch arm 64 is moved to cause the blade 63 to engage the contact member 62. The current will now flow from the battery 44, through the wire 52', supporting rod 48, through the extension 61 of the switch arm 50, through the contact member 62, blade 63, wires 66 to the lamp 65. The circuit will also flow through wires 68 and 69, illuminating the headlights 67. It will of course be obvious that when the switch arm 50 is operated to complete the circuit to illuminate lamp 20, the extension 61 is moved away from the contact member 62, breaking the circuit to the headlights 67 and tail light 65 to cause a flash and attract the attention of the people near the signal. It will of course be understood that coiled springs 71 are connected with each switch blade, to return the switch blades to their inoperative positions, when the switch blades are released, by the operator.

As clearly shown by Figure 11, the contact member 59, as well as the contact members 72 and 73, are mounted on the bar 74 to which the wire 60 is connected. Switch arm 51 carries a contact member 75 at its free end, which contact member is adapted to engage the contact member 72, to complete the circuit to the lamp 20. The contact arm 51 also engages the contact member 76 that is in circuit with the electro-magnet 22 located within the housing, and situated in such a way as to draw the armature 43 to the left, moving the arrow to the right.

The circuit between contact member 76 and this electro-magnet is made through the wire 77. The switch arm 52 carries a contact member 78 that engages the contact member 73, to complete the circuit to the lamp 20. Contact member 79 is also engaged by the arm 52 to complete the circuit to the wire 80, which leads to the electromagnet 22 located within the housing at the right side thereof, so that when this magnet is energized, the arrow will move to the left, indicating that the direction of travel will be to the left. It is of course understood that with the turning of the arrow, the translucent members of the cage 28 are brought before the openings 6 of the housing, to display colors.

The reference character 81 designates a contact bar that has one end thereof engaging the bar 74, the contact bar 81 being connected with the contact member 82, to which the wire 83 is connected, the wire 83 leading to the spot light 84, the circuit being grounded through the wire 85. Thus it will be seen that each time the circuit to the lamp 20 is completed, the spot light will also be illuminated. Associated with the contact member 82 is a contact member 86, which is so positioned that it may be engaged by the end 87 of the contact blade 88, when the lever 89 is swung to the limit of one of its movements.

The end 90 of the contact blade 88, is so arranged that it may be moved to engage the contact member 82, to complete the circuit to the wire 91, which leads to the dim light 92. The dim light 93 is in circuit with the wire 91, through the wire 94, the circuits to the lamps 92 and 93 being grounded through the wire 95.

The wire 91 is shown as connected with the contact blade 88. The wire 96 is in circuit with the wire 91 and wire 94, the wire 96 extending to the contact member 97 that is engaged by the contact member 98, actuated by the brake pedal 99. Leading from the contact member 98 is a wire 100, which is in circuit with the brake lamp 101 at the rear of the vehicle, the circuit being grounded through the wire 102. As the brake pedal 99 is moved forwardly to operate the brake, it will be seen that the circuit to the brake lamp 101 will be completed, signaling to people at the rear of the vehicle, that the brake is being applied.

Should it be desired to operate the vehicle with the headlights 67 illuminated, the lever 89 is moved to cause the end 87 of the switch blade 88, to engage the contact member 86 and the end 90 to engage the contact member 82. The circuit is now completed through the wire 52', rod 48, contact member 86, switch blade 88, contact member 82, wire 83, and spot light 84. The circuit is also completed through the wires 91 and 94, to the dim lights 92 and 93. Should the operator desire to operate the indicator to indicate a movement of the vehicle to the left, the switch arm 52 is depressed. As the switch arm 52 is depressed, the switch arm contacts with the contact member 79, completing the circuit to the magnet 22 located at the right side of the casing, energizing the magnet to operate the indicator. As the contact member 52 is depressed further, the contact 78 engages the contact member 73, completing the circuit to the lamp 20 to illuminate the indicator.

Light rays are also projected through the translucent members which have now been moved before the openings 6 of the housing. When it is desired to operate the signal to indicate a right turn, the switch arm 51 is depressed to complete the circuits between the arm 51 and contact member 76, to energize the magnet at the opposite side of the housing, whereupon a further depression completes the circuit to the lamp 20, through the wire 60, by the contact of the contact members 75 and 72.

As clearly shown by Figure 11, the contact members 76 and 79 are substantially long, so that the electro-magnets will be energized prior to the lighting of the lamp 20.

I claim:

In a signalling device, a main housing having display openings, a rotatable signalling member operating within the housing, and having display openings, means for rotating said signalling member whereby the openings of the housing and signalling member register displaying signals, a vertical spring housing mounted within the main housing directly under the signalling member at one side of the axis of rotation of the signalling member, a coiled spring within the spring housing, a disc engaging one end of the spring, a flexible member secured to the disc and extending upwardly through the spring and terminating at a point within the signalling member, a bracket eccentrically mounted within the signalling member, and said spring adapted to return the signalling member one end of the flexible member being connected to the bracket to its normal inactive position.

JOHN P. HANSON.